July 19, 1932.  E. C. HORTON, ET AL  1,868,232
WINDSHIELD HEATER
Filed Dec. 9, 1929
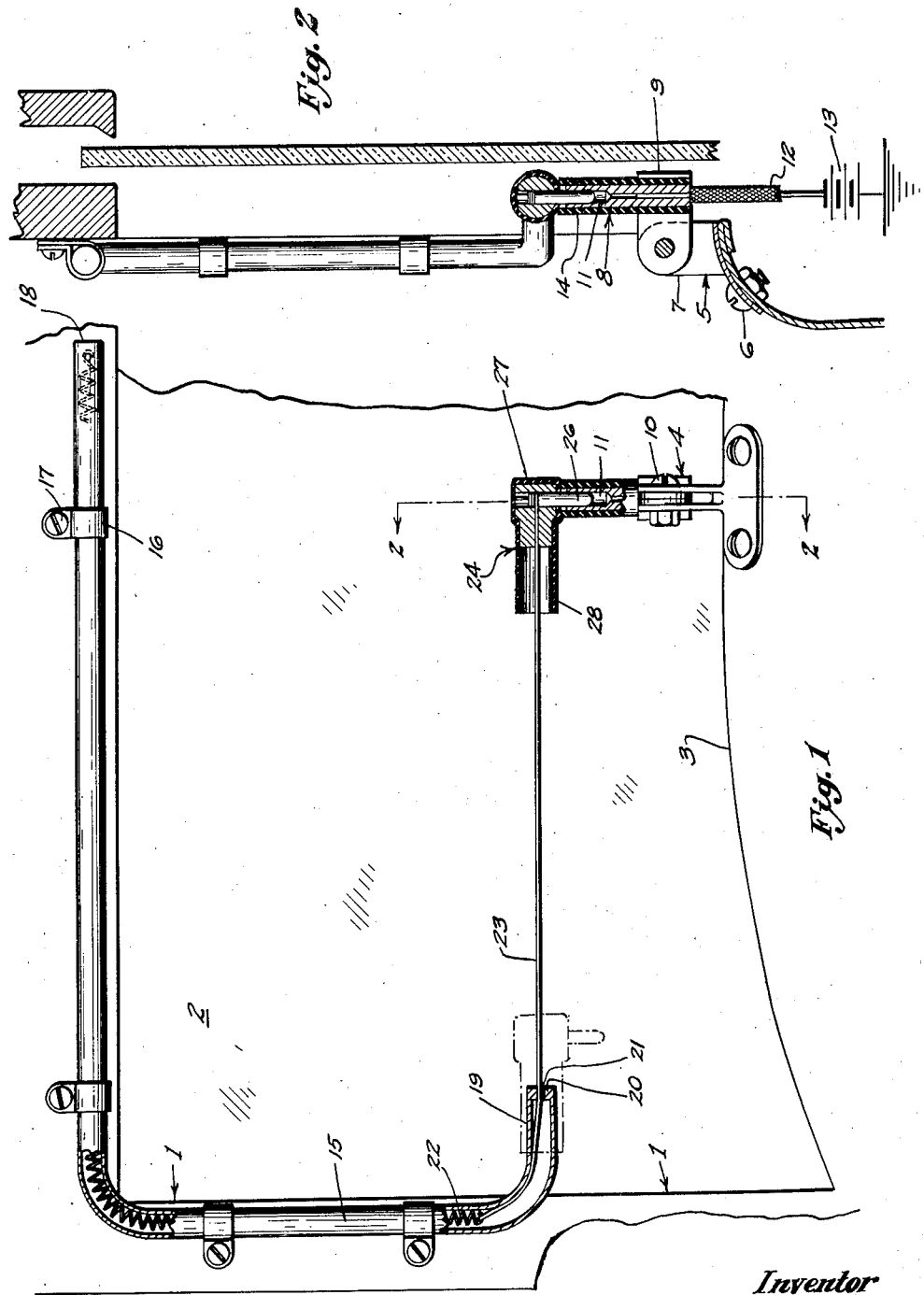
Inventor
Erwin C. Horton and
Henry Hueber
by Barton A. Beane
Attorney Patented July 19, 1932

1,868,232

UNITED STATES PATENT OFFICE

ERWIN C. HORTON, OF HAMBURG, AND HENRY HUEBER, OF BUFFALO, NEW YORK, ASSIGNORS TO TRICO PRODUCTS CORPORATION, OF BUFFALO, NEW YORK

WINDSHIELD HEATER

Application filed December 9, 1929. Serial No. 412,812.

This invention relates to windshield heaters which are used to clear the windshield of ice or sleet.

This application is an improvement on our copending application filed November 13, 1929, Serial No. 406,827. In the said copending application a heating element was retractible into a housing for an inoperative disposal. The present application provides a different type of retraction means which does not subject the relatively brittle heating element to unusual bending.

An object of this invention is to provide a heating unit of the retractible element type with a retraction tube, which is adapted to be mounted on any convenient location adjacent a windshield and which may be shaped to suit the various disposals necessary in the adaption thereof on different types of automobiles.

Another object is to secure the unit against any annoying vibration when in its inoperative position.

The invention will further be found to reside in the salient features of construction, whereby the heater will be disposed in an inconspicuous position adjacent a windshield.

In the accompanying drawing:

Fig. 1 is a partial view of a windshield provided with a heater embodying the present invention, portions of the heater being in section.

Fig. 2 is a section on the line 2—2 of Fig. 1.

Proceeding in accordance with the present invention the resistance element, as in the pending application referred to, is automatically retractible to an inoperative position within its casing when its free end is disengaged from its anchor. The present invention chiefly concerns improvements in the casing and method of retraction, wherein the casing may be applied in any number of inconspicuous positions on or within a windshield frame.

In the drawing the numeral 1 indicates a windshield frame which contains the windshield 2. A sill 3 extends across the lower portion of the windshield. For the purpose of facility of illustration a well known slidable type of windshield is herein depicted. It will be understood that the device about to be described may be applicable to any type of windshield frame or automobile window frame, or to any side or sill thereof.

In the showing an anchor member 4 of similar structure to the anchor member shown in the said copending application, is shown fastened to the sill 3 in spaced relation to the left side of the windshield frame 1. The said anchor member comprises a bracket 5 secured to the sill 3 by fastening bolts 6 and provided with a bearing portion 7 upon which is pivotally mounted a post 8 by the strap 9. The said strap clampingly receives the said post and is provided with a bearing portion which is mounted on the bearing portion 7 by the screw 10. The post is provided with a socket 11 and is attached to a circuit wire 12 which leads to the battery 13. The post is insulated from the strap 9 by an insulating sheathing 14.

The present application provides a heater element and retraction means therefor of improved form over the copending application which include a tube 15. This tube may be disposed adjacent the windshield in a suitable manner, such as is herein illustrated wherein it is shaped about the top and side of the frame 1 and fastened thereto by a number of clips 16 which clampingly encircle the said tube upon being fastened to the said frame by the screws 17. This assembly positively grounds the tube through the frame of the car to the battery. The end 18 of the said tube is closed and the feed end 19 extends from the frame in a horizontal direction and is closed by a bearing portion 20 which has a small orifice 21. A resilient member, such as a coil spring 22, is mounted within the said tube, one of its extremities being secured adjacent the end 18 of the tube and the remaining extremity being connected to a heating member 23, which preferably comprises a resistance wire. The heating member extends through the orifice 21 and is operatively connected to the head 24 which is preferably cylindrical and provided with a radially extending pin 26. The cylindrical portion is covered by an insulating sheathing 27 which projects beyond the same and forms a cap portion 28 which is adapted to fit over the end 19 of the said tube.

In its inoperative position the heating member is withdrawn under the action of the spring 22 within the tube 15, and the cap portion 28 of the head 24 is maintained over the end 19 by the spring pressure, and is thus held against unnecessary vibration and also presents a neat appearance. The dotted showing in Fig. 1 shows this inoperative position.

In operation the head and accompanying heating member is withdrawn from the tube against the action of the spring 22 and the pin 26 of the said head is inserted in the socket 11 of the post 8 thus completing the circuit for operation of the heating member. When other than straight tubing is installed, it is preferred that the bends in the tube be of generous radius so as not to subject the relatively brittle resistance wire to unusual bending stresses, and it is therefore highly desirable, when mounting conditions permit, to eliminate or to greatly flatten such curves, the straight tube being the ideal arrangement.

It will be understood that the tube assembly is intended as an adaptable member which may be applicable in numerous arrangements or forms adjacent a windshield. By using a tube or other elongated housing the heating member 23 is supported inoperatively in a more or less straight, extended and unbent condition for practically its entire length.

This unit readily adapts itself to mounting within a windshield frame, being particularly desirable when a hollow windshield frame is used, wherein the tube may be mounted within such frame and the bearing portion 20 may protrude therethrough.

What is claimed is:

1. A windshield heater comprising a tube mounted adjacent a windshield and having an open end and a closed end, a spring within said tube having one end connected thereto adjacent the said closed end, an anchor member mounted adjacent the windshield and spaced from the open end of said tube, an elongated heater member having an end connected to the remaining end of said spring, said heater member being retracted within said tube through said open end by action of said spring when in an inoperative position and being withdrawn therefrom and having its free end connected to said anchor member when in an operative position, said spring holding the heater member taut when the latter is engaged with the anchor member, and means for rendering said heater element operative.

2. A windshield heater comprising a tube mounted adjacent a windshield, an anchor member adjacent said windshield and spaced from said tube, a spring having one end mounted within said tube at one extremity thereof, a heating member having one end connected to the remaining end of said spring and being withdrawable through the remaining extremity of said tube and connectible to said anchor for positioning on said windshield and means carried by the opposite end of the heating member for electrical and mechanical engagement with the anchor member whereby the heating member is energized by and during engagement of said means with said anchor member.

3. A windshield heater comprising an elongated housing, an elongated heating member withdrawable therefrom, and means acting to retract the heating member within the housing and to support the heating member inoperatively therein in a substantially extended and unfolded position.

4. A windshield heater comprising a housing having a tubular feed end, a heating member in the housing and withdrawable therefrom through the feed end, means for retracting the member within the housing, and a head on said heating member having a cap portion telescoping the feed end and being supported by the latter when the heating member is retracted within the housing.

5. A windshield heater comprising a tube mounted adjacent the windshield and having an open end, an anchor member spaced from the open end of said tube and adjacent the windshield, a heating member housed within the tube and withdrawable therefrom through the open end thereof, and a head on the outer end of said heating member, said head having an insulated grip portion by which the same may be handled, and also an electrical connection part for engagement with the anchor member, said part serving to mechanically and electrically connect the head to the anchor member whereby the heating member will become energized for heating the windshield, said heating member and anchor member being designed for connection in an electric circuit.

6. A windshield heater comprising a tube mounted adjacent the windshield and having an open end, an anchor member spaced from the open end of said tube and adjacent the windshield, a heating member housed within the tube and withdrawable therefrom through the open end thereof, a head on the outer end of said heating member, said head having an insulated grip portion by which the same may be handled, and also having an electrical connection part for the anchor member, said part serving to mechanically and electrically connect the head to the anchor member whereby the heating member will become energized for heating the windshield, and spring means for urging and retracting the heating member into the tube when disengaged from the anchor member.

7. A windshield heater comprising a tube mounted adjacent the windshield and having an open end, an anchor member spaced from the open end of said tube and adjacent the windshield, a heating member housed within the tube and withdrawable therefrom through the open end thereof, a head on the outer end of said heating member, said head having an insulated grip portion by which the same may be handled, and also having an electrical connection part for the anchor member, said part serving to mechanically and electrically connect the head to the anchor member whereby the heating member will become energized for heating the windshield, and spring means for urging and retracting the heating member into the tube when disengaged from the anchor member, said head having a cap portion for telescoping the open end of said tube when the heating member is retracted whereby the head is secured to the tube.

ERWIN C. HORTON.
HENRY HUEBER.